J. GOULDING.
SIDE CAR ATTACHMENT TO MOTOR BICYCLES.
APPLICATION FILED AUG. 12, 1918.
1,303,791. Patented May 13, 1919.
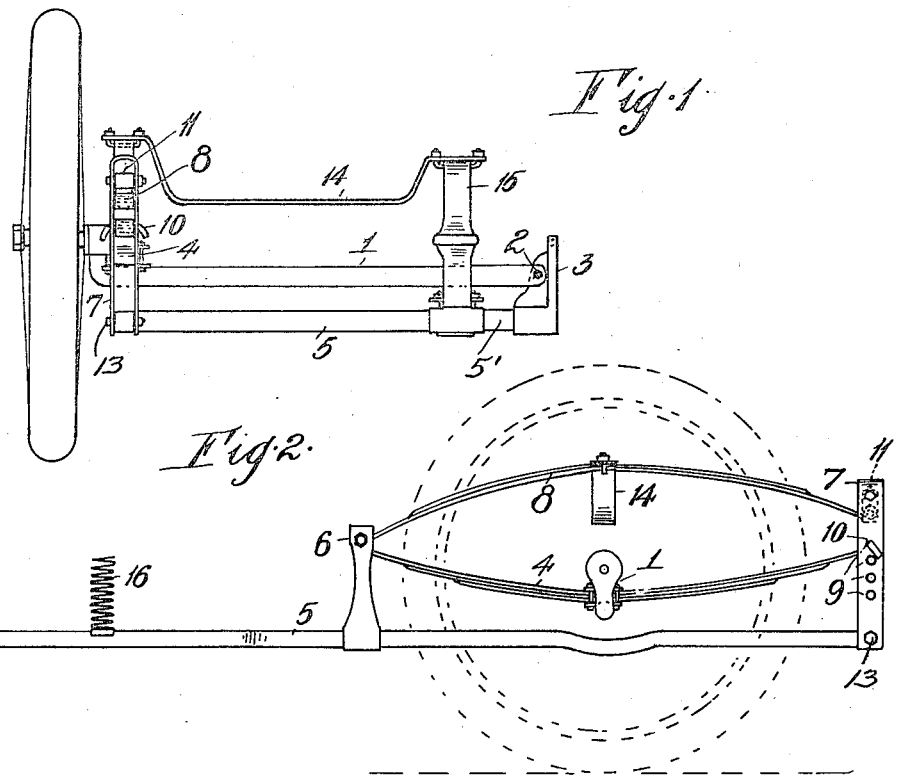
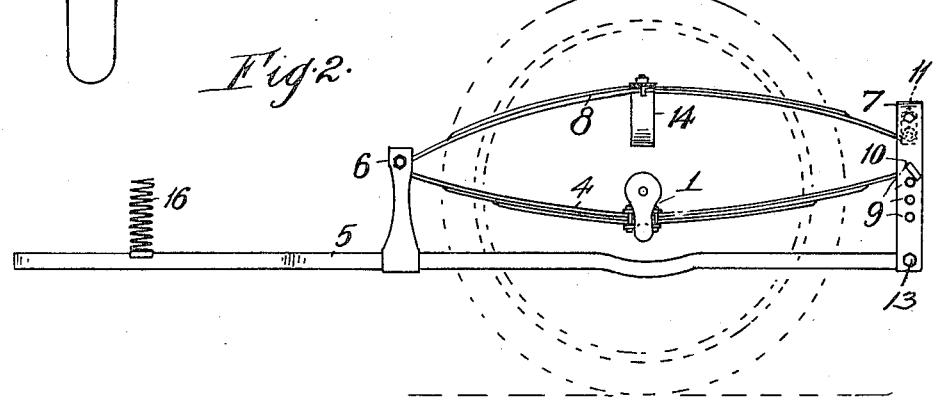
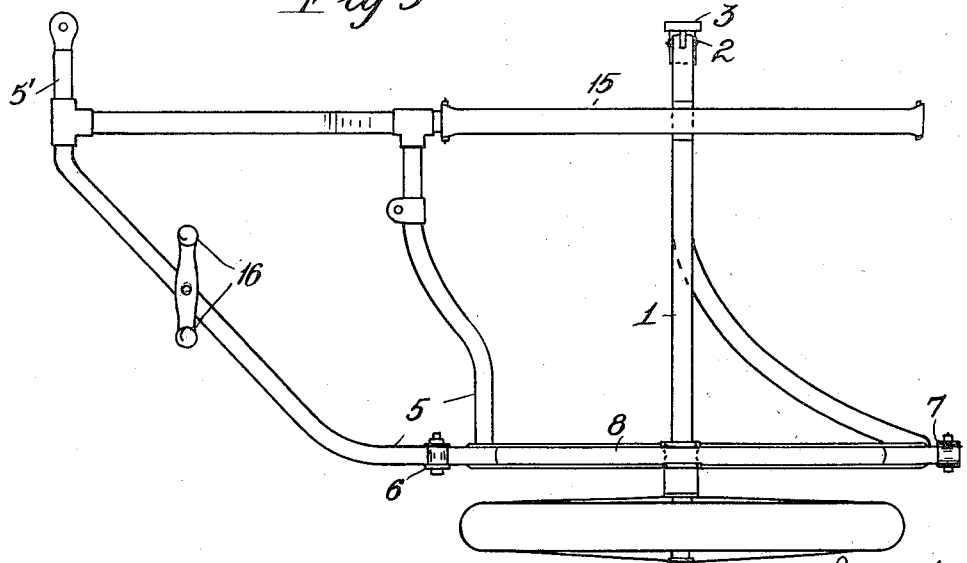

UNITED STATES PATENT OFFICE.

JAMES GOULDING, OF SURREY HILLS, VICTORIA, AUSTRALIA.

SIDE-CAR ATTACHMENT TO MOTOR-BICYCLES.

1,303,791.  Specification of Letters Patent.  Patented May 13, 1919.

Application filed August 12, 1918. Serial No. 249,458.

*To all whom it may concern:*

Be it known that I, JAMES GOULDING, a subject of the King of Great Britain, residing at 220 Prospect Hill road, Surrey Hills, in the State of Victoria, Australia, have invented certain new and useful Improvements in and Relating to Side-Car Attachments to Motor-Bicycles, of which the following is a specification.

The present invention refers to side car attachments to motor bicycles and specifically to means whereby the supporting wheel of the side car is capable of resilient vertical movement relative to the chassis and side car body in order to absorb the road shocks imparted to the wheel.

The object of my invention is to provide in a simple and novel manner for the wheel movement mentioned and at the same time provide effective and resilient support of the outside forward end of the side car chassis.

Briefly stated the essential features of my invention comprise a horizontal wheel axle the inner end of which is pivotally attached or universally jointed to one of the frame members of a motor bicycle, the outer or wheel carrying end of the axle being spring connected to the chassis and preferably to the forward end of the latter. Said spring may be of leaf or laminated form and extended rearwardly past said axle and its rear end attached to a vertical or approximately vertical link, the lower end of which latter is pivotally held to the chassis.

The spring may be full elliptical, the upper half of which operates as the outside spring support for the body, and means are provided for adjustment of the lower half of the spring to suit varying loads of the car body.

A practical illustration of the invention is given in the accompanying drawings whereof—

Figure 1 is a rear view of a side car attachment incorporating the improvements;

Fig. 2 a side view; and

Fig. 3 a plan of same.

Referring to these drawings the wheel axle 1 of the attachment is attached at its inner end by a pivot 2 to a fitting 3 which is connected at its upper end to a member of the bicycle frame. The outer portion of the axle is connected to the center of a laminated or leaf semi-elliptic spring 4 attached at its forward end to the upper end of a standard 6 rigidly attached to the chassis 5 which latter is secured at its forward end to the frame members of the bicycle by an inwardly projecting portion 5′ in the usual way. The rear end of the spring is attached to a vertical link 7 pivoted as at 13 to the chassis. The link may consist of an elongated U shaped bar in which the rear end of the spring 4 is housed.

In the preferred construction an additional semi-elliptic laminated or leaf spring 8 is provided and located above the spring 4, the two spring members constituting a full elliptic spring. The front end of said spring 8 is connected to the top of the rigid standard 6 and its rear end to the lower end of a shackle 11 pivotally hung from the top of the link 7 and housed within the latter. A transverse bar 14 suitably bent is attached to the spring 8 and to another spring 15 on the chassis which bar supports the car body (not illustrated) which rests at its front end on the springs 16.

In order to provide for adjustment of the tension of spring 4 its rear end is rendered vertically adjustable on the link in approved manner. As illustrated, series of apertures 9 are formed through the limbs of the link in coincident pairs and the pin 10 which is used to attach the rear end of the spring to the link is passed through one of the pairs of said apertures according to the load to be supported on the spring.

The same object may be accomplished by forming series of connected slots or notches in the link and moving the pin from one slot to another.

I claim:—

1. In a side car attachment for motor bicycles, a side car chassis connected to the frame of the bicycle, a semi-elliptic spring on the chassis, and a wheel axle pivotally connected at its inner end to the bicycle frame and connected at its outer end to the center of the spring.

2. The construction as set forth in claim 1 and in which the outer end of the axle is supported by a semi-elliptical spring connected at its front end to a fixed standard and rearwardly to a link pivoted to the chassis frame.

3. The construction as set forth in claim 2 and in which the rear end of the spring is vertically adjustable on the pivoted link to which it is connected.

4. The construction as set forth in claim 1 and in which the outer end of the axle is supported by the lower half of an elliptical spring, the upper half of the spring operating to support the side car body.

5. The construction as set forth in claim 4 and in which the rear end of the lower half of the spring is vertically adjustable.

6. The construction as set forth in claim 4 and in which the rear of the upper half of the elliptical spring is connected to a shackle pivotally hung from the pivoted link to which the rear end of the lower half of said spring is attached.

7. The construction as set forth in claim 4 in which the front of the elliptical spring is connected to a standard rigidly attached to the chassis.

In testimony whereof I have hereunto set my hand.

JAMES GOULDING.